United States Patent
Gauss et al.

(10) Patent No.: US 11,435,019 B2
(45) Date of Patent: Sep. 6, 2022

(54) VALVE GUIDE WITH INTEGRAL ASSEMBLY SUPPORT

(71) Applicant: Eaton Intelligent Power Limited, Dublin (IE)

(72) Inventors: Jason C. Gauss, Jackson, MI (US); Gary M. Jenski, Jr., Jackson, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/937,935

(22) Filed: Jul. 24, 2020

(65) Prior Publication Data

US 2021/0025528 A1 Jan. 28, 2021

Related U.S. Application Data

(60) Provisional application No. 62/878,427, filed on Jul. 25, 2019.

(51) Int. Cl.
| | |
|---|---|
| *F16L 37/22* | (2006.01) |
| *F16L 37/32* | (2006.01) |
| *F16L 37/40* | (2006.01) |
| *B33Y 80/00* | (2015.01) |
| *F01L 3/08* | (2006.01) |
| *F16K 15/02* | (2006.01) |

(52) U.S. Cl.
CPC ............ *F16L 37/22* (2013.01); *F16L 37/32* (2013.01); *F16L 37/40* (2013.01); *B33Y 80/00* (2014.12); *F01L 3/08* (2013.01); *F16K 15/026* (2013.01); *Y10T 137/7932* (2015.04); *Y10T 137/7933* (2015.04)

(58) Field of Classification Search
CPC ... F16L 37/22; F16L 37/32; F16L 3/08; F16L 37/40; B33Y 80/00; F16K 15/026; Y10T 137/7932; Y10T 137/7933
USPC ............................ 251/142, 149, 149.1, 149.6
See application file for complete search history.

(56) References Cited

U.S. PATENT DOCUMENTS

| | | | | |
|---|---|---|---|---|
| 2,522,145 | A | * | 9/1950 | Thompson ............... F16K 17/04 137/543 |
| 2,594,641 | A | * | 4/1952 | Griffith ................. F16K 15/063 137/543 |

(Continued)

FOREIGN PATENT DOCUMENTS

| | | | |
|---|---|---|---|
| DE | 202011004779 U1 | 6/2011 | |
| WO | WO-02079678 A1 * | 10/2002 | ............. E03C 1/104 |

(Continued)

OTHER PUBLICATIONS

European Search Report, EP20188010, dated Nov. 24, 2020.
European Office Action, 20188010.1, dated Nov. 17, 2021.

*Primary Examiner* — Craig M Schneider
*Assistant Examiner* — Frederick D Soski
(74) *Attorney, Agent, or Firm* — Merchant & Gould P.C.

(57) ABSTRACT

A valve guide for a coupling including a circular, longitudinally extending portion, including a substantially circular channel extending therethrough; a ring portion; a plurality of ports radially disposed around a centerline of the valve guide; and one of more collar supports disposed radially about the circular, longitudinally extending portion. The valve guide comprises a unitary one-piece component. A male portion for a coupling that includes a valve guide with integral assembly support and a method for assembling a coupling assembly are also disclosed.

15 Claims, 5 Drawing Sheets

(56) References Cited

U.S. PATENT DOCUMENTS

| | | | | |
|---|---|---|---|---|
| 3,117,592 A * | 1/1964 | Abbey | F16L 29/04 | 137/614.03 |
| 3,205,911 A * | 9/1965 | Swick, Jr. | F16L 29/04 | 137/614.03 |
| 3,672,631 A * | 6/1972 | Grise | F16L 37/40 | 251/149.6 |
| 3,788,348 A * | 1/1974 | Johnson | F16L 37/23 | 137/542 |
| 3,864,537 A * | 2/1975 | Fiore | H01H 35/2614 | 200/83 S |
| 3,994,317 A | 11/1976 | Miyazaki et al. | | |
| 3,995,658 A * | 12/1976 | Hager | F16K 15/063 | 137/543 |
| 4,368,756 A * | 1/1983 | Carlson | F16K 15/06 | 137/541 |
| 4,535,808 A * | 8/1985 | Johanson | F16K 15/063 | 137/533.21 |
| 5,027,845 A * | 7/1991 | Silagy | F16L 37/23 | 137/74 |
| 5,092,364 A * | 3/1992 | Mullins | F16L 37/23 | 137/614.05 |
| 5,145,083 A * | 9/1992 | Takahashi | B65B 7/2878 | 137/614.2 |
| 5,255,699 A * | 10/1993 | Herzan | F16L 37/23 | 137/1 |
| 5,265,844 A * | 11/1993 | Westfall | F16L 37/40 | 251/149.1 |
| 5,810,048 A * | 9/1998 | Zeiner-Gundersen | F16L 29/04 | 137/614.04 |
| 5,893,391 A * | 4/1999 | Jenski, Jr. | F16L 37/32 | 137/614.04 |
| 5,911,403 A * | 6/1999 | deCler | B67D 7/0294 | 251/149.6 |
| 5,921,276 A * | 7/1999 | Lam | F16K 15/026 | 137/220 |
| 6,009,902 A * | 1/2000 | Troiani | F16L 37/28 | 137/614.11 |
| 6,145,322 A * | 11/2000 | Odashima | F16L 37/32 | 251/149.6 |
| 6,237,631 B1 * | 5/2001 | Giesler | F16K 31/0689 | 137/614.04 |
| 6,328,348 B1 * | 12/2001 | Cornford | F16L 37/22 | 285/305 |
| 7,708,025 B2 * | 5/2010 | Johnson | F16K 27/0209 | 251/91 |
| 8,813,782 B2 * | 8/2014 | Becocci | B60T 17/043 | 137/614.03 |
| 9,404,244 B1 * | 8/2016 | Gass | F16K 15/063 | |
| 9,901,729 B2 * | 2/2018 | Vigna | F16L 37/367 | |
| 10,738,901 B1 * | 8/2020 | Andersson | F16K 27/0209 | |
| 2003/0025096 A1 * | 2/2003 | Jeory | F16L 29/02 | 251/149 |
| 2004/0238048 A1 * | 12/2004 | Mikiya | F16L 37/32 | 137/614.04 |
| 2005/0001194 A1 * | 1/2005 | Bachelder | F16L 29/04 | 251/149.6 |
| 2005/0103387 A1 * | 5/2005 | Voege | F16L 37/36 | 137/614.04 |
| 2005/0263193 A1 * | 12/2005 | Carmack | F16L 37/32 | 137/614.04 |
| 2007/0001143 A1 * | 1/2007 | Konishi | F16L 37/23 | 251/149.8 |
| 2008/0289702 A1 * | 11/2008 | Aragones | F16L 37/32 | 137/515 |
| 2010/0201123 A1 * | 8/2010 | Kitagawa | F16L 37/23 | 285/308 |
| 2011/0241331 A1 * | 10/2011 | Arisato | B23Q 1/0018 | 285/18 |
| 2012/0006428 A1 * | 1/2012 | Erwin | F16L 37/32 | 137/512 |
| 2013/0019973 A1 * | 1/2013 | Gose | F16L 37/32 | 137/798 |
| 2014/0373949 A1 * | 12/2014 | Manzato | F16L 37/34 | 137/614.04 |
| 2015/0377402 A1 * | 12/2015 | Boothe | F16L 55/1015 | 251/149.7 |
| 2016/0047503 A1 * | 2/2016 | Ballard | B67D 7/42 | 251/149.7 |
| 2017/0146174 A1 * | 5/2017 | Gennasio | F16L 37/28 | |
| 2017/0159864 A1 * | 6/2017 | Thomas | F16K 1/465 | |
| 2017/0307122 A1 * | 10/2017 | Imoto | F16L 37/23 | |
| 2018/0299055 A1 * | 10/2018 | Thomas | F16L 37/40 | |
| 2019/0101234 A1 * | 4/2019 | Quang | F16L 37/23 | |
| 2020/0182389 A1 * | 6/2020 | Fr Re | B60K 15/03006 | |
| 2020/0376501 A1 * | 12/2020 | Herman | F16K 15/026 | |
| 2021/0190250 A1 * | 6/2021 | Backstrom | F16L 29/04 | |

FOREIGN PATENT DOCUMENTS

| | | |
|---|---|---|
| WO | 06080883 A1 | 8/2006 |
| WO | 19093941 A1 | 5/2019 |

* cited by examiner

VALVE GUIDE WITH INTEGRAL ASSEMBLY SUPPORT

CROSS-REFERENCE TO RELATED APPLICATION

This application claims the benefit of U.S. Provisional Patent Application Ser. No. 62/878,427, filed on Jul. 25, 2019, the disclosure of which is hereby incorporated by reference in its entirety as though fully set forth herein.

TECHNICAL FIELD

The present disclosure generally relates to valve guides, including valve guides that may be used in connection with a male half of a quick disconnect or a female half of a quick disconnect coupling (QD).

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Conventional valve guides that are used in male halves of quick disconnects often do not incorporate features to provide support of a valve retention collar during initial assembly. Such valve guides commonly require the use of an installation or assembly tool, which is usually used for installation from the backside of the quick disconnect.

Among other things, it would be desirable to eliminate the need for an installation or assembly tool, and without affecting the size of the quick disconnect. It would further be desirable to allow the quick disconnect to be used with elbow assemblies using one-piece, unitary bodies, and further to have the ability to connect to quick disconnects of the same style without being affected. The ability to form a one-piece, unitary component/body can eliminate the need for multi-piece bodies having or requiring an elastomeric seal between components. Further, such a one-piece, unitary component can save cost and/or weight, and may eliminate potential leak paths.

There is a desire for solutions/options that minimize or eliminate one or more challenges or shortcomings of valve guides and fluid couplings. The foregoing discussion is intended only to illustrate examples of the present field and is not a disavowal of scope.

SUMMARY

Among other things, the use of a one-piece, unitary component/body can save cost and weight and may eliminate potential leak paths. Embodiments of the novel valve guides may be designed or configured to avoid a need to change external dimensions used with existing QDs, so connectivity to QDs of the same or similar type/style is not materially affected.

In embodiments, a valve guide for a coupling including a circular, longitudinally extending portion, including a substantially circular channel extending therethrough; a ring portion; a plurality of ports radially disposed around a centerline of the valve guide; and one of more collar supports disposed radially about the circular, longitudinally extending portion. The valve guide comprises a unitary one-piece component. A male portion for a coupling that includes a valve guide with integral assembly support and a method for assembling a coupling assembly are also disclosed.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
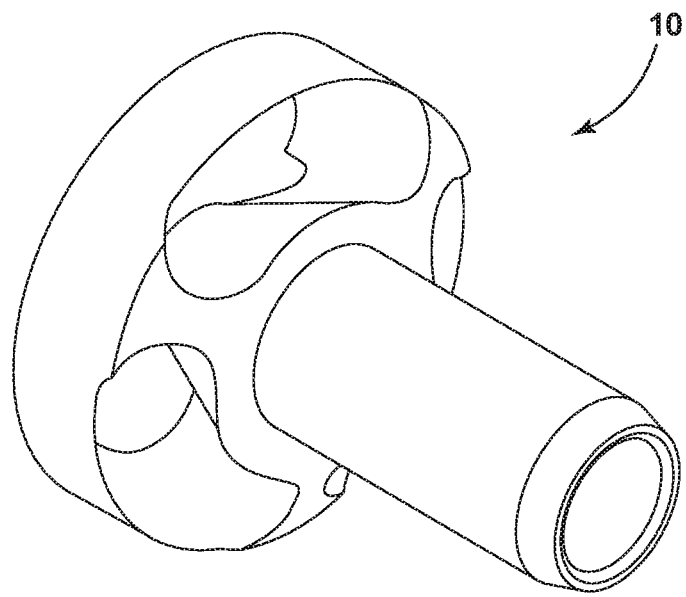
FIG. 1 is a perspective view generally illustrating an embodiment of a more conventional valve guide.

FIG. 1 generally illustrates a perspective view of an embodiment of a valve guide 10.

Figure 2:
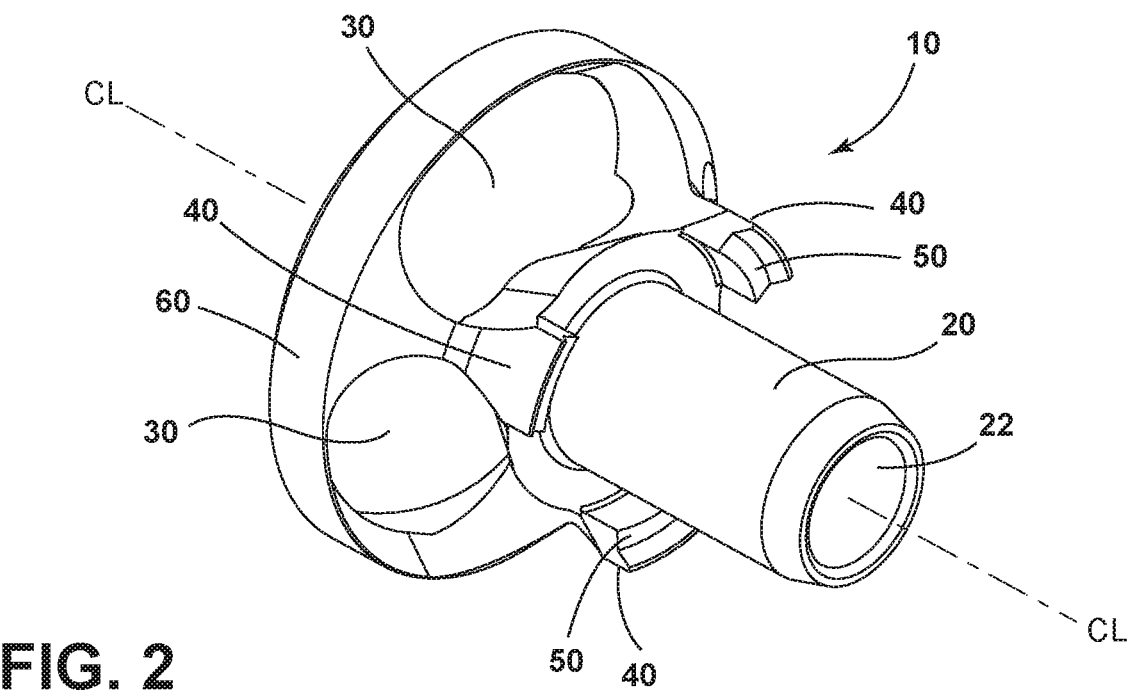
FIG. 2 is a perspective view generally illustrating another embodiment of a valve guide according to teachings of the present disclosure.
Figure 3:
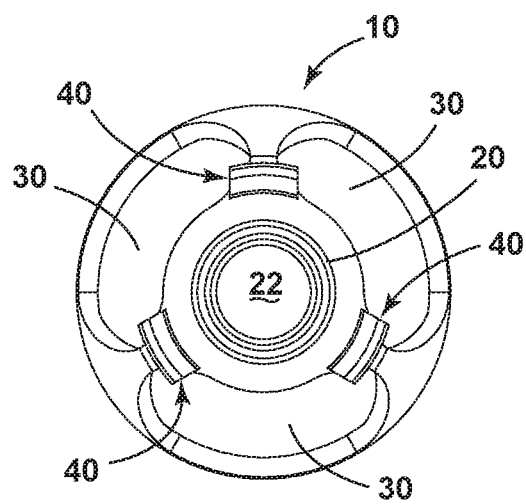
FIG. 3 is a top view generally illustrating an embodiment of a valve guide such as shown in FIG. 2.
Figure 4:
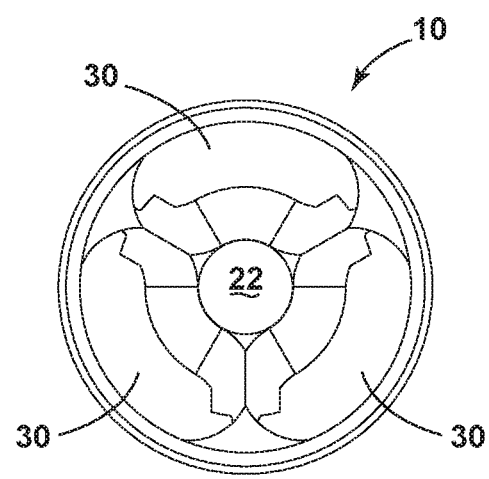
FIG. 4 is a bottom view generally illustrating an embodiment of a valve guide such as shown in FIG. 2.
Figure 5:
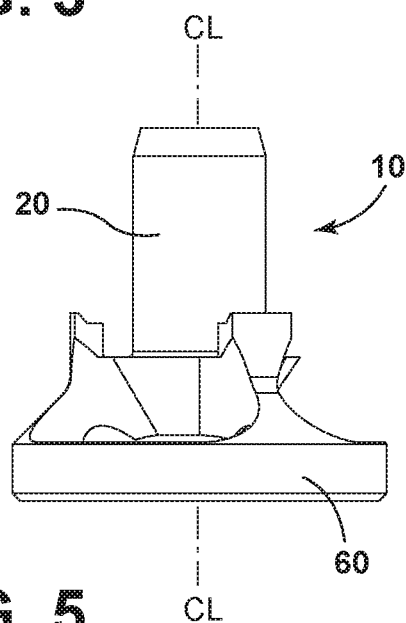
FIGS. 5-8 are left, right, rear, and front side views, respectively, generally illustrating an embodiment of a valve guide such as shown in FIG. 2.
Figure 6:
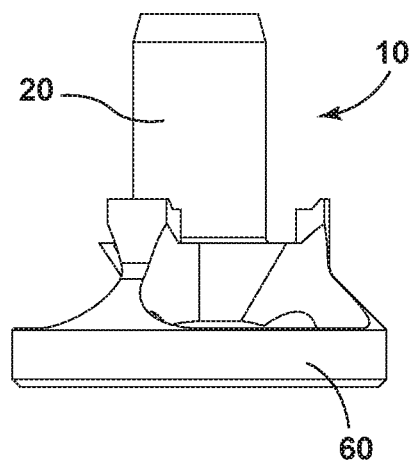
Figure 7:
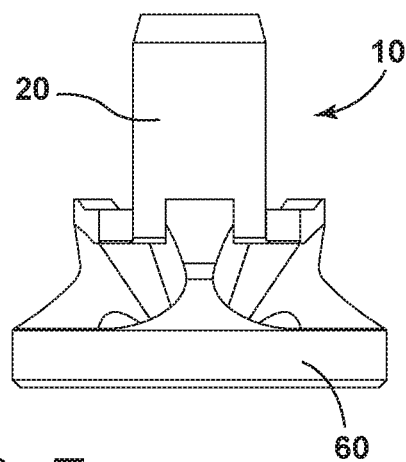
Figure 8:
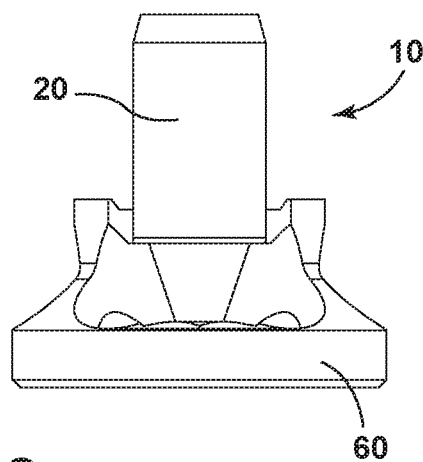

Another embodiment of a valve guide 10, with an integral assembly support, is generally illustrated in FIG. 2. In embodiments, such as generally illustrated in FIG. 2, a valve guide 10 may include inter alia, a circular, longitudinally extending portion 20, which includes a substantially circular channel 22 extending therethrough; a plurality of ports 30 (which may be radially disposed around a centerline of the guide 10 and/or the extending portion 20); one or more collar supports 40, each may further include a collar support pad 50, and a ring portion (or outer circular portion) 60. The one or more collar supports 40 are integral with the valve guide and may be configured to, inter alia, to provide assembly support. In embodiments, the one or more collar supports may extend in a longitudinal direction (e.g., in a direction of centerline CL). Embodiments of a valve guide 10 may comprise a variety of shape and size modifications (including variations from that depicted), and may be comprised of one or more various materials.

Moreover, embodiments of valve guides 10, such as disclosed herein, may be formed as a single, unitary component, which may be formed from a common material. Such single, unitary components may be formed as a one-piece component, which may comprise a metal or a plastic material, and may, if desired, be formed via additive manufacturing.

Figure 9:
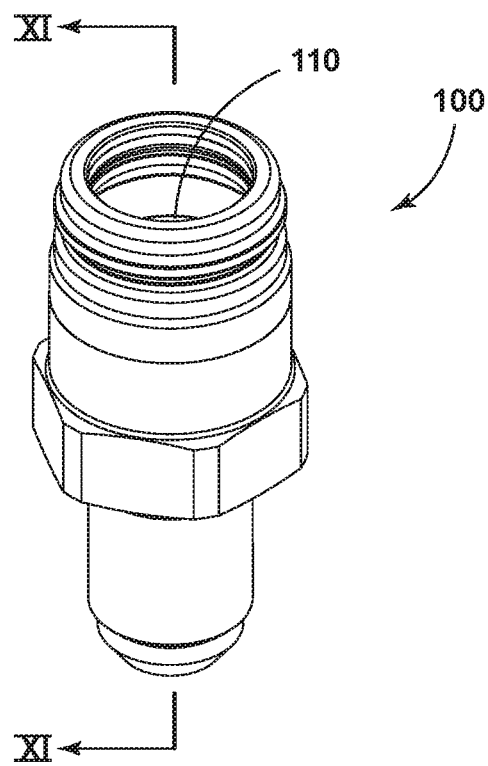
FIGS. 9 and 10 are perspective views generally illustrating an embodiment of a male portion for a coupling assembly according to teachings of the present disclosure.
Figure 10:
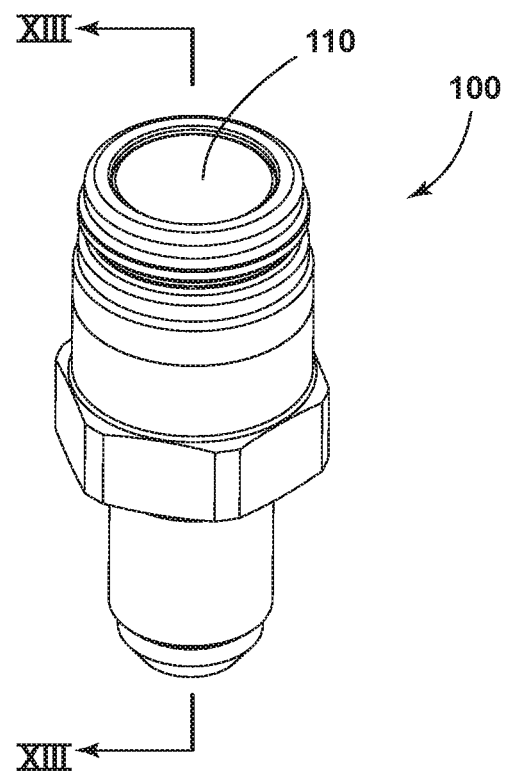
Figure 11:
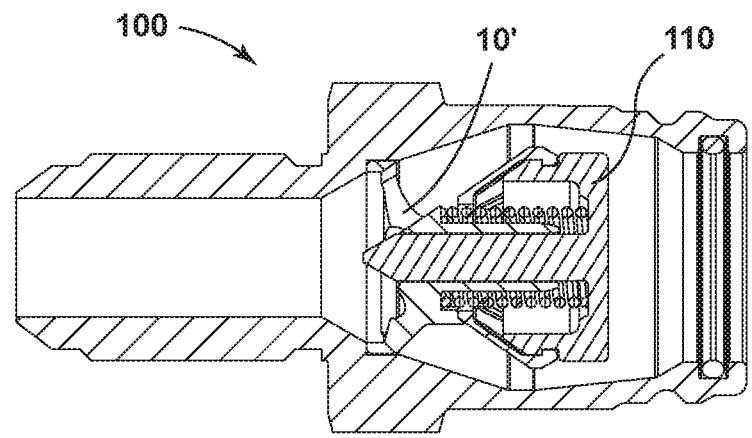
FIG. 11 is a cross sectional view of the male portion shown in FIG. 9.
Figure 13:
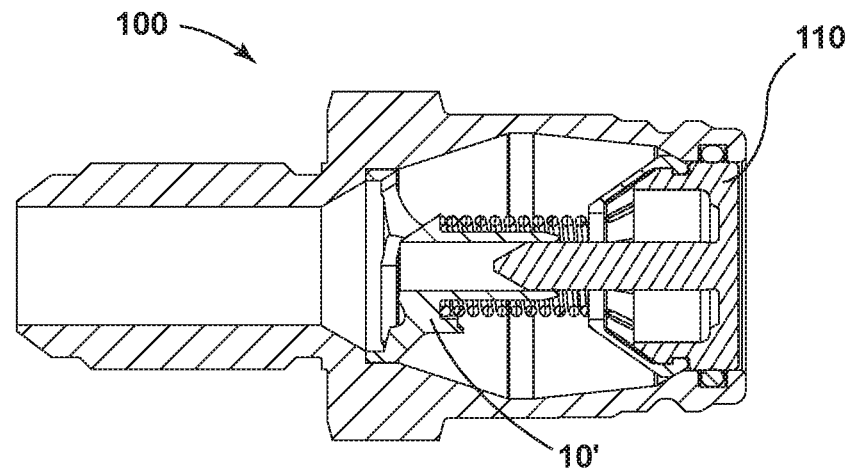
FIG. 13 is a cross sectional view of the male portion shown in FIG. 10.

FIGS. 9 and 10 generally illustrate an embodiment of a male portion 100 for a coupling assembly, such as a quick disconnect assembly. FIGS. 11 and 13 generally illustrate cross sectional views of an embodiment of the male portion 100. As generally illustrated, in FIGS. 9-11, a male portion 100 may include a valve guide 10' and a valve 110. FIGS. 9 and 11 generally illustrate a valve 110 in a first (or open) position/configuration, and FIGS. 10 and 13 generally illustrate a valve 110 in a second (or closed) position/configuration.

Figure 12:
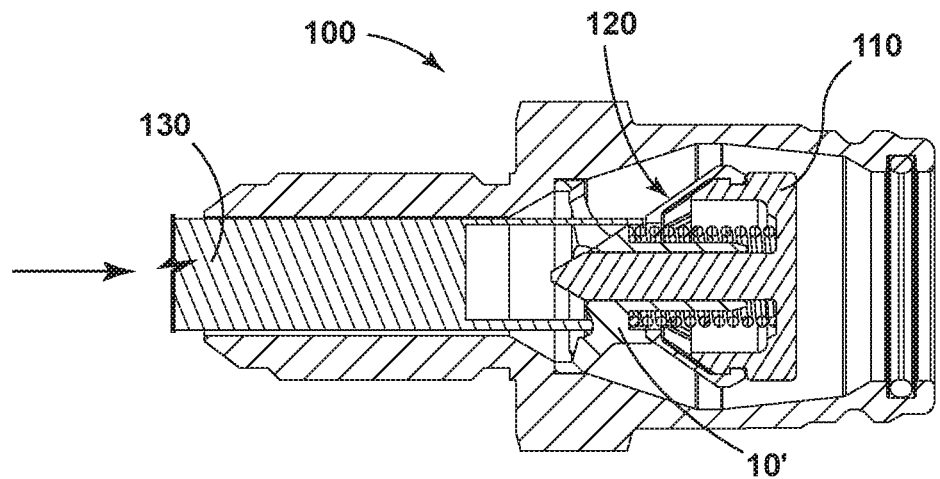
FIG. 12 is a cross sectional view similar to that shown in FIG. 11, generally illustrated with a partial insertion of an associated tool component.

FIG. 12 generally illustrates the use of a tool 130, and a manner in which it may be used in connection with a male portion 100 and a valve guide more in the nature of that shown in FIG. 1. In general, such a tool 130 would need to be inserted from a backside of a quick disconnect coupling component, and through guide ports, in order to provide support to collar 120 while it is positioned (e.g., snapped) over a valve during assembly. However, such a tool can be challenging to work with, may be thin, and/or may be prone to damage or may damage components within the male portion 100 when inserted or removed. In contrast, embodiments of the disclosed valve guide 10, including those illustrated herein, may eliminate the need for such a tool. Moreover, associated housings (e.g., housing 150) may be made into or with elbows, or may be manipulated (e.g., dropped down) to a smaller size without affecting the ability to position (e.g., snap) the collar over the valve to retain it in the male portion/assembly (as no separate tool insertion is required).

Figure 14:
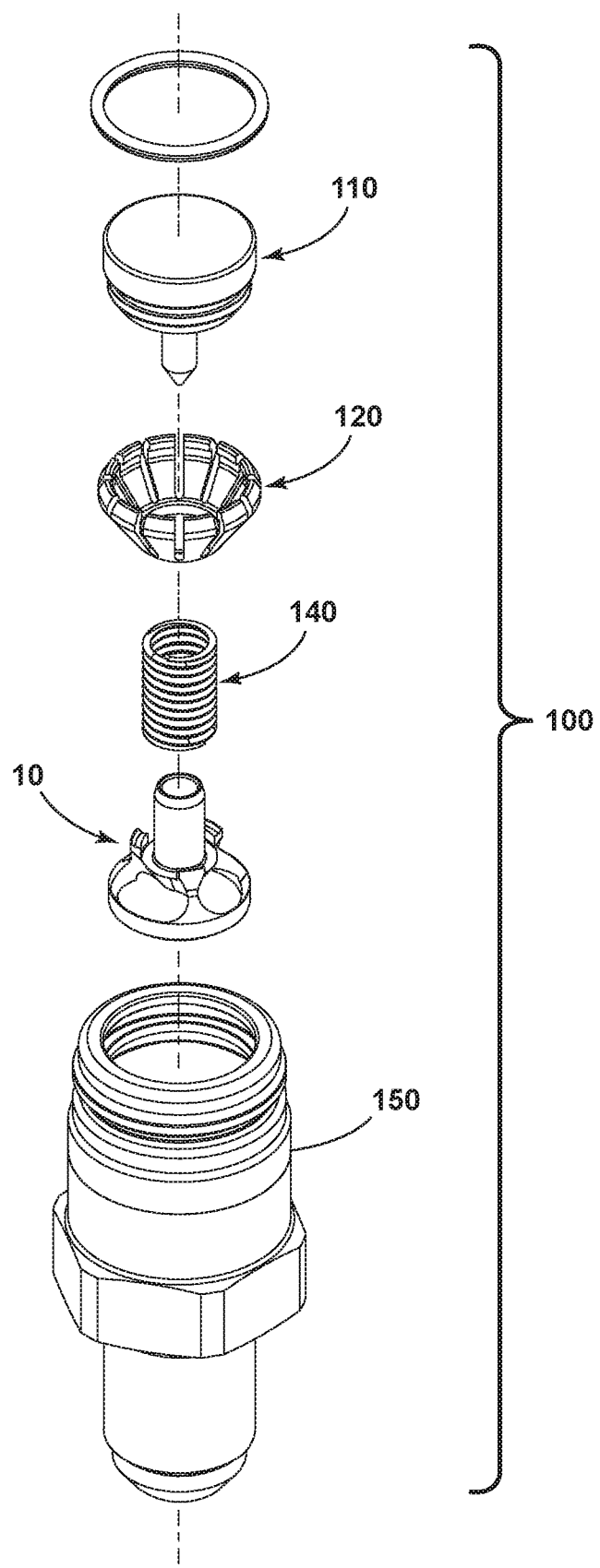
FIG. 14 is an exploded perspective view generally illustrating an embodiment of a male portion for a coupling assembly according to teachings of the present disclosure.

FIG. 14 generally depicts an exploded perspective view of a male portion 100 for a coupling assembly according to teachings of the present disclosure. As generally illustrated, the male portion may include, inter alia, a valve guide 10, a valve 110, a collar 120, a spring 140 (which may provide a biasing force), and a housing 150.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples", "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples", "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A valve guide for a coupling, comprising:
   a circular longitudinally extending portion, including a circular channel extending therethrough;
   a ring portion;
   at least one port radially disposed around a centerline of the valve guide; and two or more collar supports disposed radially about the circular longitudinally extending portion, each of the two or more collar supports including a protrusion that extends longitudinally which defines a space between the two or more collar supports and the circular longitudinally extending portion, wherein each of the two or more collar supports has a collar support pad, wherein the protrusion of the two or more collar supports extends longitudinally beyond the collar support pad;

wherein the valve guide comprises a unitary one-piece component.

2. The valve guide of claim 1, wherein the valve guide has at least three ports and at least three collar supports.

3. The valve guide of claim 2, wherein each of the at least three ports are positioned between two collar supports.

4. The valve guide of claim 1, wherein the collar support pad is configured to support a collar.

5. The valve guide of claim 1, wherein the valve guide is comprised of one material.

6. The valve guide of claim 1, wherein the valve guide is comprised of a metal or plastic material.

7. The valve guide of claim 1, wherein the valve guide is comprised of metal.

8. The valve guide of claim 1, wherein the valve guide is comprised of plastic.

9. The valve guide of claim 1, wherein the valve guide is formed by additive manufacturing.

10. A male portion for a coupling, comprising:
a valve guide including a circular longitudinally extending portion, with a circular channel extending therethrough, a ring portion, a plurality of ports radially disposed around a centerline of the valve guide, and two or more collar supports disposed radially about the circular longitudinally extending portion, each of the two or more collar supports including a protrusion that extends longitudinally which defines a space between the two or more collar supports and the circular longitudinally extending portion, wherein each of the two or more collar supports has a collar support pad, wherein the protrusion of the two or more collar supports extends beyond the collar support pad;
a valve;
a collar; and
a housing;
wherein the valve guide comprises a unitary one-piece component, and the two or more collar supports are configured to support a portion of the collar.

11. The male portion for a coupling of claim 10, wherein the valve guide is formed by additive manufacturing.

12. The male portion for a coupling of claim 10, wherein the male portion is configured to be part of a quick disconnect coupling.

13. The male portion for a coupling of claim 10, including a spring.

14. The male portion for a coupling of claim 10, wherein the collar is configured to be positioned over the valve without the use of a separate tool.

15. A method for assembling a coupling assembly, comprising:
providing a one-piece, unitary valve guide for a coupling assembly including a circular longitudinally extending portion; a plurality of ports; and two or more collar supports disposed radially about the circular longitudinally extending portion, each of the two or more collar supports including a protrusion that extends longitudinally which defines a space between the two or more collar supports and the circular longitudinally extending portion, wherein each of the two or more collar supports has a collar support pad, wherein the protrusion of the two or more collar supports extends beyond the collar support pad; and
disposing the valve guide within a portion of a coupling assembly;
wherein the valve guide provides support for a valve retention collar during assembly.

* * * * *